United States Patent
Bhagavatula

(10) Patent No.: US 6,243,460 B1
(45) Date of Patent: Jun. 5, 2001

(54) TELEPHONE WITH CHARACTER KEYPAD

(75) Inventor: Satyasai Bhagavatula, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/324,849

(22) Filed: Oct. 14, 1994

Related U.S. Application Data

(63) Continuation of application No. 08/163,320, filed on Dec. 8, 1993, now abandoned.

(51) Int. Cl.[7] ............................................. H04M 11/00
(52) U.S. Cl. .................... 379/368; 379/369; 379/370; 379/361; 379/110
(58) Field of Search .................. 379/110, 368, 379/369, 370, 361, 354, 352, 353, 355, 52, 97, 360

(56) References Cited

U.S. PATENT DOCUMENTS

| | | | |
|---|---|---|---|
| 4,252,994 | * | 2/1981 | Holloman ........................ 379/368 X |
| 4,533,791 | * | 8/1985 | Read et al. ........................ 379/110 X |
| 4,763,356 | * | 8/1988 | Day, Jr. et al. ........................ 379/368 |
| 4,839,919 | * | 6/1989 | Borges et al. ...................... 379/354 X |
| 4,885,580 | * | 12/1989 | Noto et al. ........................ 379/354 X |
| 5,388,154 | * | 2/1995 | Solomon ............................... 379/368 |
| 5,467,392 | * | 11/1995 | Norimatsu ............................ 379/355 |

FOREIGN PATENT DOCUMENTS

9203884 * 3/1992 (WO) ................................... 379/110

OTHER PUBLICATIONS

DAK Industries Catalog, Fall 1984 p. 53.*

* cited by examiner

Primary Examiner—Forester W. Isen
Assistant Examiner—Clark S. Cheney
(74) Attorney, Agent, or Firm—M. B. Johannesen

(57) ABSTRACT

A telephone that has dual keypads, wherein one of the keypads is a standard 12 number (1–9, 0, #, and *) keypad and the other keypad comprises a plurality of keys having a single character on each key. When a character key is pressed, it generates a DTMF pair corresponding to one of the 12 standard DTMF pairs.

22 Claims, 3 Drawing Sheets

TELEPHONE WITH CHARACTER KEYPAD

This application is a continuation of application Ser. No. 08/163,320, filed on Dec. 8, 1993, now abandoned.

TECHNICAL FIELD

This invention relates to the field of telephone station sets, and, more specifically, to a telephone station set with a plurality of buttons for generating dual-tone, multifrequency signals representing numerics and non-numeric characters.

BACKGROUND OF THE INVENTION

For many years, telephones have had keypads instead of rotary dials for entering the destination telephone number. The caller enters digits by pressing keys or buttons on this keypad. Each button causes a unique pair of tones to be sent from the telephone to the network. Each unique tone pair is recognized by the network as a different number.

FIG. 2 illustrates a typical telephone keypad wherein each button generates unique tone pairs for each number. There are seven frequency lines disposed in a four by three matrix for the twelve buttons. As each button is pushed, the pair of frequencies are activated, thus generating a unique dual-tone, multifrequency (DTMF) signal. The frequencies were selected so that they are not harmonic overtones of each other. For example, pressing the button "5" activates the frequency pair 770 Hz and 1336 Hz, which a network or other monitoring device recognizes as a "5".

In addition to representing numeric digits, some of the buttons also are used to represent non-numeric characters. There are 3 letters associated with eight of the numbered buttons (2–9), representing the English alphabet (no Q or Z). In recent years, businesses have discovered that by forming telephone numbers using the letters on the buttons, they can create telephone numbers that were easy to remember, and consumers are more likely to call a business whose number they can easily remember. Thus, vanity numbers became a big business. Many businesses now have telephone numbers that include, in whole or part, some alphabetic form of their names or slogans. In fact, mnemonic names are now used as a telephone number for access services such as, for example, making a collect call by dialing 1-800-OPERATOR.

A problem for some consumers using these vanity numbers is caused by the fact that the letters are difficult to find. Three letters are found on each of eight buttons; they are usually much smaller in size than the numeral, and they are arranged in groups not commonly associated with each other. As a result, there is a problem in locating the required letters, resulting in dialing difficulty, delay, and frequent misdialing.

SUMMARY OF THE INVENTION

This problem is solved and a technical advance is achieved in the art by a telephone that has dual keypads. One of the keypads is a standard 12 button (1–9, 0, #, and *) keypad. The other keypad comprises a plurality of buttons having a single character on each button. Advantageously, when a character button is pressed, it causes a DTMF pair to be sent to the network, wherein the DTMF pair corresponds to one of the 12 standard DTMF pairs which are produced by the numeric keypad. The signals from the telephone set are identical to those provided by a normal telephone set.

DETAILED DESCRIPTION

Figure 1:
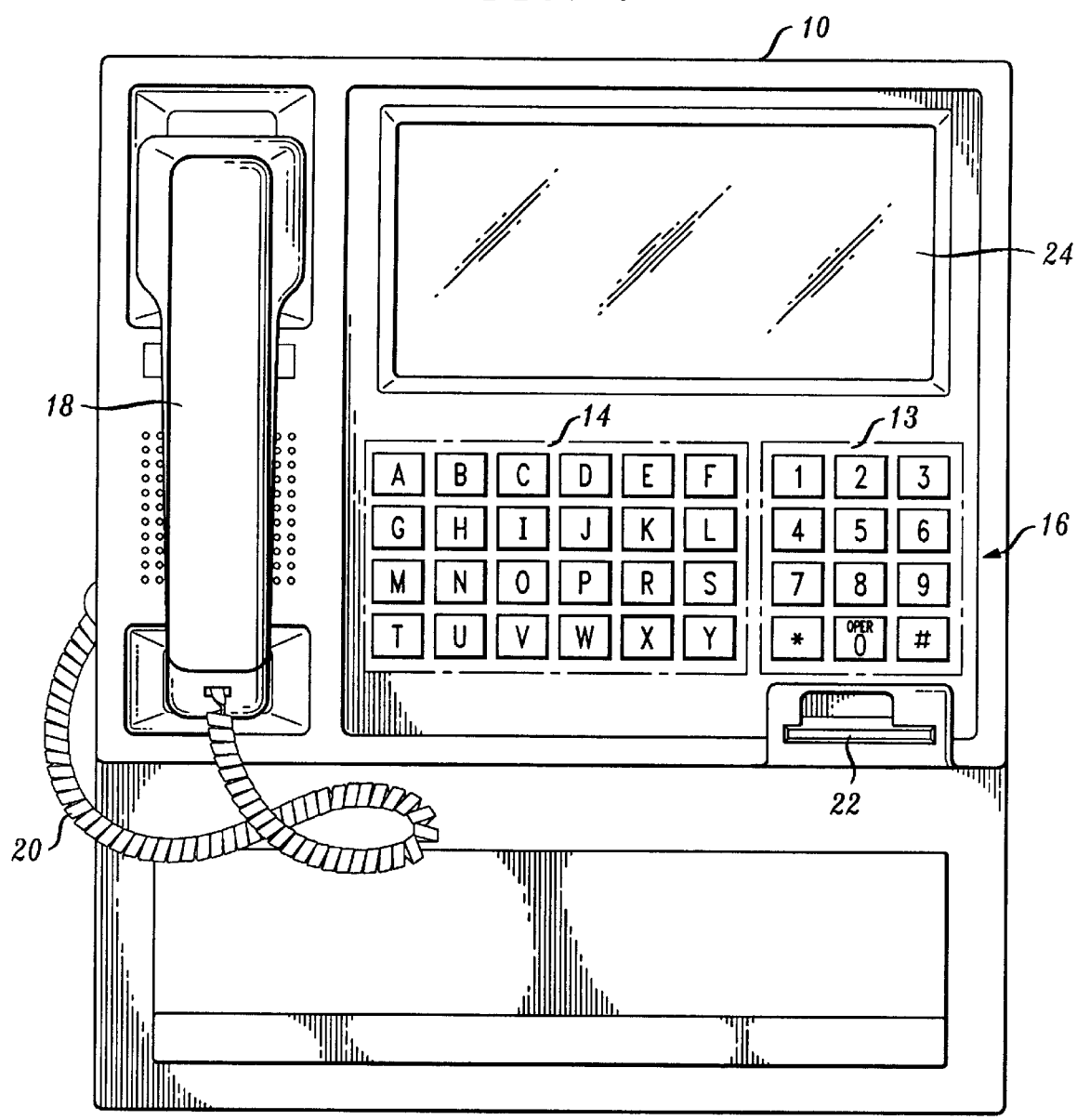
FIG. 1 is a plan view of a credit card operated telephone having a numeric keypad and a character keypad according to an exemplary embodiment of this invention.

FIG. 1 is a plan view of a credit card operated telephone 10 having a numeric keypad 13 and a character keypad 14 according to an exemplary embodiment of this invention. Since vanity telephone numbers (such as 1-800-OPERATOR for collect calls) are frequently dialed from airports and similar locations, a credit card telephone is used to illustrate the preferred embodiment of this invention. Other types of consumer telephones for home and business use may include a character and numeric keypad without departing from the scope of this invention.

Telephone 10 comprises a base station 16 and hand piece 18 connected to the base station by a cord 20 as known in the art. Hand piece 18 comprises a receiver and a mouthpiece as is known in the art. Base 10 includes a slot 22 for a credit card or smart card and a display 24 for instructions. Base 10 also includes two keypads or button groups according to this invention. Numeric keypad 13 includes 12 buttons labeled 1–9, 0, * and #. Numeric keypad 13 causes DTMF signals to be sent to the network as in the prior art. Unlike the prior art, these buttons are not labeled with additional characters, such as letters from the English alphabet. (Buttons of keypad 13 could retain dual labels, but to avoid confusion, they have been omitted).

Figure 2:
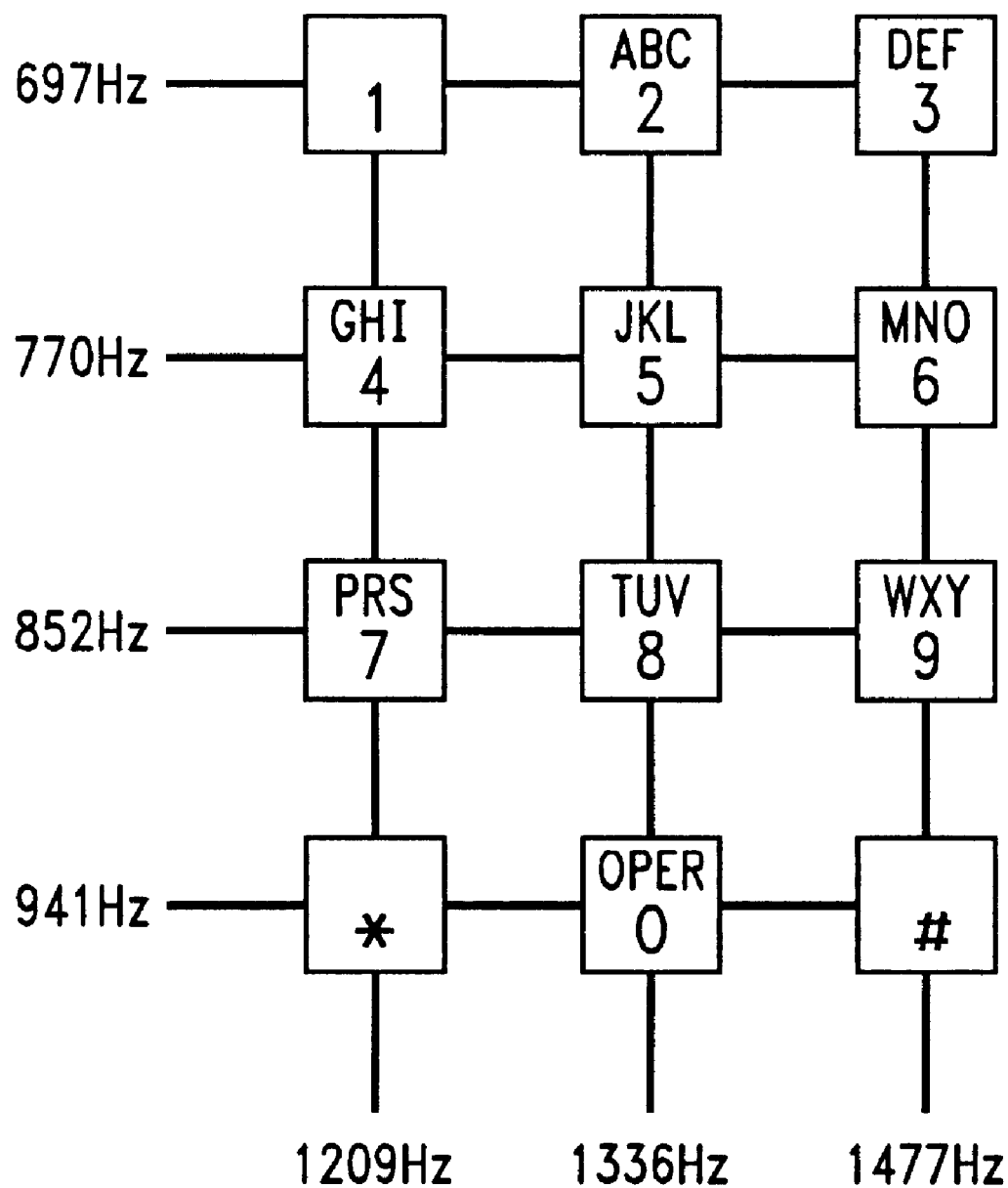
FIG. 2 illustrates a typical prior art telephone keypad wiring diagram.

A separate character keypad 14 is positioned adjacent to numeric keypad 13. Character keypad 14 presents the characters which are shown in the prior art (FIG. 2) on the buttons of the numeric keypad along with the numbers. In the exemplary embodiment of FIG. 1, character keypad 14 has the English characters "A–P" and "R–Y". As is standard in American practice, there is no "Q" or "Z" on a telephone. However, it is within the purview of one skilled in the art to add any additional characters desired. Character keypad 14 causes DTMF signals to be sent to the network. By use of this novel character keypad 14, a telephone customer may enter alphabetical telephone numbers such as vanity numbers (i.e., 1-800-OPERATOR) fluidly and easily, without having to translate letters to numbers, which many customers find confusing. By use of this invention, customers may save time and effort and make more efficient use of the network by dialing more carefully with fewer mistakes. Furthermore, security codes and the like may be made into easy to remember words or phrases, while still providing the network (or other destination) with the expected DTMF signaling.

Figure 3:
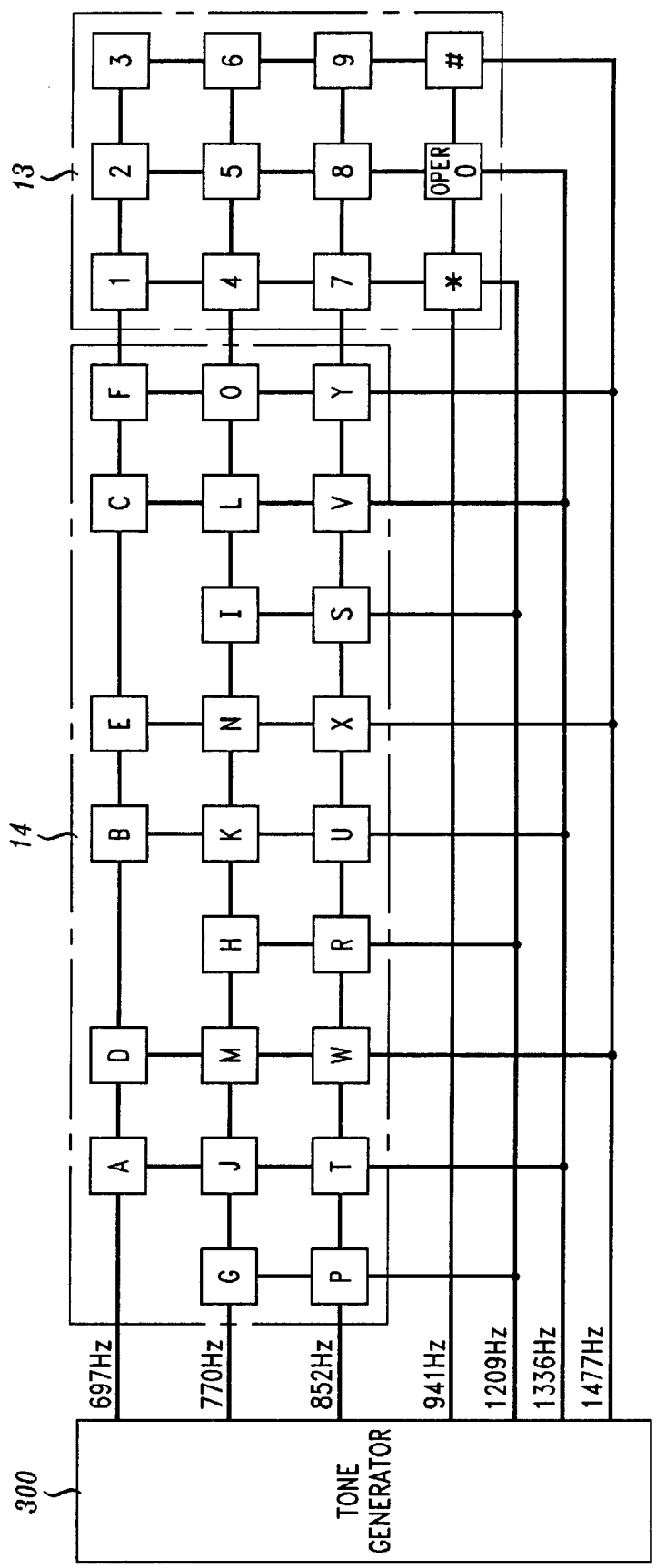
FIG. 3 illustrates a wiring diagram for a character keypad according to an exemplary embodiment of this invention.

Turning now to FIG. 3, a DTMF wiring pattern for a character keypad according to an exemplary embodiment of this invention is shown. Again, this example illustrates American practice. Tone generator 300 within telephone 10 generates 697 Hz, 770 Hz, 852 Hz, 941 Hz, 1209 Hz, 1336 Hz, and 1477 Hz tones as is well known in the art. Each character (and numeric) button is connected to an intersection of two DTMF lines. Pressing a button causes two tones to be sent to the network. The character and numeric buttons are grouped so that one numeric button and the appropriate character buttons all produce the same DTMF signal. When the character "A" is pressed, 697 Hz and 1336 Hz tones are produced. These tones correspond to the number "2". Since in American practice the letter "A" is on the "2" button of prior art telephones, the same DTMF frequencies must be produced by either the "A" on keypad 14 or the "2" on keypad 13. Similarly, pressing "B" and "C" produces the same "2" DTMF output. All other character buttons are similarly connected to produce the same DTMF output as would be produced by the corresponding numeric button of the prior art.

Many variations of this invention may be made by one skilled in the art without departing from the scope of this invention. For example, characters from any language may be applied to the character keyboard. Additional characters may be added to any language's character set and assigned a DTMF tone-pair (such as the Q and Z). Additional DTMF pairs may also be selected for use with this invention to provide recognition of special characters. Also, the characters on the character keypad may be arranged in any order (i.e., the familiar QWERTY order).

Also, instead of buttons, display 24 may be configured to represent two distinct keypads and provide touch capability which is then translated into DTMF. Furthermore, the buttons of character keypad 14 and numeric keypad 13 may be connected to display 24 in order to give the user visual feedback of the characters dialed (additional button sensing would be provided in order to distinguish among the buttons that generate the same DTMF pair, such as "A", "B", and "C"). Therefore, it is intended that such variations be covered by the scope of the appended claims.

What is claimed is:

1. A telephone station set connectable to a network comprising:

a tone generator, said tone generator generating a plurality of tones;

a numeric keypad directly connected to said tone generator; and a character keypad directly connected to said tone generator, said character keypad being separate from said numeric keypad;

said numeric keypad having a plurality of numeric buttons, each of said numeric buttons directly connected to said tone generator such that a unique dual-tone, multifrequency (DTMF) tone pair preselected from said plurality of tones and associated with each numeric button is sent to said network on activation of said each of said numeric buttons;

said character keypad having a plurality of character buttons greater in number than said plurality of numeric buttons, each of said plurality of character buttons directly connected to said tone generator such that a DTMF tone pair at said tone generator, said tone pair corresponding to one of said unique DTMF tone pairs associated with one of said numeric buttons, is sent to said network on activation of said each of said plurality of character buttons.

2. A telephone according to claim 1 wherein said numeric buttons are labeled with the numeral 1 through 9, 0, *, and #, and the character buttons are labeled with the English alphabet letters A–P and R–Y.

3. A telephone according to claim 1 further comprising a display, wherein said plurality of numeric buttons and said plurality of character buttons are connected to said display such that said display displays each number and character entered.

4. A telephone according to claim 1 wherein said each of said plurality of buttons of said numeric keypad is labeled with a unique number or symbol and each of said character buttons is labeled with a unique character.

5. A telephone station set connectable to a telephone network, said telephone comprising:

a base;

a plurality of buttons on said base, each of said plurality of buttons causing an output to said network when pressed;

said plurality of buttons being organized into a plurality of button groups, each button group comprising selected ones of said plurality of buttons, every button in each of said button groups causing the same output to said network when pressed; and buttons in different ones of said plurality of button groups causing different outputs to said network when pressed.

6. A telephone according to claim 5, wherein each group has at least three buttons, each of said three buttons being labeled differently but causing the same output to said network when activated.

7. A telephone set comprising:

a tone generator;

a numeric keypad having a plurality of first buttons;

connection means for interconnecting each of said first buttons to said tone generator and for delivering directly to said tone generator, in response to activation of each one of said first buttons, a distinct indication identifying the one first button;

said tone generator producing, in response to each said distinct indication, a dual tone multifrequency output, unique to the identified first button;

a character keypad having a plurality of second buttons;

each of said second buttons being connected directly to the connection means interconnecting each of said first buttons to said tone generator, such that activation of each of said second buttons produces one of said distinct indications unique to one of said first buttons, and such that activation of any one of a subset of said second buttons produces the same one of said distinct indications.

8. A telephone set according to claim 7 wherein a subset of said second buttons comprises at least three of said second buttons, such that activation of any of said three second buttons causes the tone generator to produce the dual tone multifrequency output associated with one of said first buttons.

9. A telephone dialing apparatus for transmitting dialing signals over a communication path connecting a telephone to a switching office, the apparatus comprising:

a telephone dialing circuit having a plurality of first inputs, plurality of second inputs and an output, connections between one of said first inputs and one of said second inputs generating a dual-tone-multi-frequency (DTMF) telephone dialing signal;

a numeric keypad directly connected to said telephone dialing circuit;

an alphabetic keyboard device directly connected to said telephone dialing circuit;

said numeric keypad having numeric keys each of which connect one of said first inputs and one of said second inputs together at said telephone dialing circuit to generate the dialing signal at the output of said telephone dialing circuit;

said alphabetic keyboard device having a plurality of switch contacts each corresponding to a single letter of the alphabet assigned to an alphabetic key, which switch contacts connect one of said first inputs and one of said second inputs together at said telephone dialing circuit to generate the dialing signal at the output of said dialing circuit, said alphabetic keyboard device being connected to said first and second inputs in accordance with predetermined mapping of alphabetic representation to numeric keys provided on a standard 12-key telephone keypad by assigning a single letter to each of said alphabetic keys for generating the dialing signal at the output of said dialing circuit; and means for coupling the telephone dialing signal from the output of said telephone dialing circuit to the communication path.

10. A telephone dialing apparatus for sending dialing signals over a communication path connecting a telephone to a switching office, the apparatus comprising:

a telephone dialing circuit having plural first inputs, plural second inputs and an output, connections between one of said first inputs and one of said second inputs generating a telephone dialing signal at the output in accordance with a predetermined telephone dialing plan;

an alphabetic keyboard device having a plurality of switch contacts each corresponding to a single letter of the alphabet assigned to an alphabetic key, which switch contacts connect one of said first inputs and one of said second inputs together at said telephone dialing circuit to generate the dialing signal at the output of said dialing circuit, said alphabetic keyboard device being connected to said first and second inputs in accordance with predetermined mapping of alphabetic representations to numeric keys provided on a standard 12-key telephone keypad by assigning a single letter to each of said alphabetic keys for generating the dialing signal at the output of said dialing circuit; and means for coupling the telephone dialing signal from the output of said telephone dialing circuit to the communication path.

11. An apparatus in accordance with claim 10 further comprising a numeric keypad having numeric keys each of which connect one of said first inputs and one of said second inputs together at said telephone dialing circuit to generate the dialing signal at the output of said telephone dialing circuit.

12. An apparatus in accordance with claim 10 wherein said telephone dialing circuit generates a dual-tone-multi-frequency (DTMF) telephone dialing signal.

13. An apparatus in accordance with claim 10 wherein said alphabetic keyboard device comprises alphabetic keys organized according to a standard typewriter QWERTY keyboard layout.

14. An alphabetic keyboard device for use with a telephone dialing circuit having plural first inputs and plural second inputs, the keyboard device comprising a plurality of switch contacts each corresponding to a single letter of the alphabet assigned to an alphabetic key, which switch contacts are connectable with one of the first inputs and with one of the second inputs of the dialing circuit to connect said one of the first inputs and said one of the second inputs together, said alphabetic keyboard device being connected to said first and second inputs in accordance with predetermined mapping of alphabetic representations to numeric keys provided on a standard 12-key telephone keypad by assigning a single letter to each of said alphabetic keys for generating the dialing signal at the output of said dialing circuit.

15. A device in accordance with claim 14 comprising first outputs and second outputs connectable to said first inputs and second inputs of said telephone dialing circuit.

16. A device in accordance with claim 15 wherein said first outputs and said second outputs comprise connection means for coupling said switch contacts to corresponding numeric keys on a 12-key standard keypad of a conventional telephone.

17. A device in accordance with claim 16 wherein three of said switch contacts each corresponding to a single letter of the alphabet assigned to a key are coupled to a single numeric digit on said 12-key standard keypad of said conventional telephone.

18. A device in accordance with claim 17 wherein the alphabetic keys are configured according to a standard typewriter QWERTY keyboard layout.

19. A telephone dialing method comprising the steps of:

providing an alphabetic keyboard having a single alphabetic letter assigned to one of a plurality of switch contacts, each alphabetic key of the alphabetic keyboard corresponding to different letters thereon;

relating each key of the alphabetic keyboard to a numeric digit in accordance with a predetermined dialing plan;

connecting the switch contacts in accordance with predetermined mapping of alphabetic representations to numeric keys provided on a standard 12-key telephone keypad by assigning a single letter to each of said alphabetic keys; and generating a telephone dialing signal responsive to depression of a key on said alphabetic keyboard and said connecting step, said signal corresponding to a numeric digit determined according to said providing step.

20. A method in accordance with claim 19 wherein said providing step provides alphabetic keys configured according to a conventional typewriter QWERTY keyboard layout.

21. A method in accordance with claim 19 wherein said providing step relates the A, B and C keys to the numeric digit 2, and D, E and F keys to the numeric digit 3, the G, H, and I keys to the numeric digit 4, the J, K and L keys to the numeric digit 5, the M, N and O keys to the numeric digit 6, the P, R and S keys to the numeric digit 7, the T, U and V keys to the numeric digit 8, and the W, X and Y keys to the numeric digit 9.

22. A method in accordance with claim 19 wherein said generating step generates a dual-tone-multifrequency (DTMF) telephone dialing signal.

* * * * *